US012632174B2

(12) United States Patent
Hayashi et al.

(10) Patent No.: US 12,632,174 B2
(45) Date of Patent: May 19, 2026

(54) MEMORY MANAGEMENT UNIT

(71) Applicant: AISIN CORPORATION, Kariya (JP)

(72) Inventors: Akira Hayashi, Kariya (JP); Takanobu Naruse, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 19/006,846

(22) Filed: Dec. 31, 2024

(65) Prior Publication Data

US 2025/0284391 A1     Sep. 11, 2025

(30) Foreign Application Priority Data

Mar. 6, 2024     (JP) ................................. 2024-033883

(51) Int. Cl.
*G06F 3/06*          (2006.01)
*G06F 12/0888*     (2016.01)

(52) U.S. Cl.
CPC .......... *G06F 3/0604* (2013.01); *G06F 3/0655* (2013.01); *G06F 3/0673* (2013.01)

(58) Field of Classification Search
CPC .. G06F 12/0888; G06F 3/0604; G06F 3/0655; G06F 3/0673; G06F 12/0804; G06F 2212/1036; G06F 2212/202; G11C 11/1675

USPC ................................................... 711/154, 103
See application file for complete search history.

(56) References Cited

U.S. PATENT DOCUMENTS

| | | | | |
|---|---|---|---|---|
| 8,601,214 | B1 * | 12/2013 | Chakalian ............. | G06F 16/172 |
| | | | | 711/143 |
| 2020/0278797 | A1 * | 9/2020 | Bavishi ................. | G06F 3/0656 |
| 2023/0214323 | A1 * | 7/2023 | Confalonieri ....... | G06F 12/0893 |
| | | | | 711/143 |

FOREIGN PATENT DOCUMENTS

JP          2010-097655 A     4/2010

* cited by examiner

*Primary Examiner* — Hashem Farrokh
(74) *Attorney, Agent, or Firm* — Sughrue Mion, PLLC

(57) ABSTRACT

A memory management unit controls, for each predetermined storage unit, a storage destination of data for which a writing request is made by a host. The memory management unit includes: a storage destination control unit configured to select the storage destination of the data for each storage unit from a main memory having the number of rewritable times less than $10^{15}$ and a cache memory able to execute copy back of writing the data for each storage unit to the main memory in accordance with a predetermined trigger; and a copy back detection unit that detects that the copy back is executed for each storage unit.

5 Claims, 2 Drawing Sheets

*FIG. 1*

COUNTING PROCESS

S100 — COPY BACK REQUEST SIGNAL IS DETECTED?

N

Y

S105 — SPECIFY PAGE OF STORAGE DESTINATION

S110 — ACQUIRE NUMBER OF REWRITING TIMES OF PAGE OF STORAGE DESTINATION FROM NONVOLATILE MEMORY

S115 — COUNT UP NUMBER OF REWRITING TIMES AND STORE IN NONVOLATILE MEMORY

MEMORY MANAGEMENT UNIT

CROSS REFERENCE TO RELATED APPLICATIONS

This application is based on and claims priority under 35 U.S.C. § 119 to Japanese Patent Application 2024-033883, filed on Mar. 6, 2024, the entire content of which is incorporated herein by reference.

TECHNICAL FIELD

This disclosure relates to a memory management unit.

BACKGROUND DISCUSSION

In the related art, an information processing system using an MRAM having a relatively small guaranteed number of rewriting times is known. For example, JP 2010-97655A (Reference 1) discloses a configuration in which data for which a writing request is made is held in a data holding circuit and data satisfying a predetermined condition is stored in an MRAM. In Reference 1, the data holding circuit holds data for each block, and also stores frequency information indicating how many writing requests for the block are issued. When there is no free block in the data holding circuit, data of a block having a low frequency of the writing requests is stored in the MRAM.

In the related art, the number of writing times to the MRAM can be reduced by transferring the data of the block having a low frequency of the writing requests to the MRAM. However, in the related art, the number of times the MRAM is actually rewritten cannot be specified.

A need thus exists for a memory management unit which is not susceptible to the drawback mentioned above.

SUMMARY

According to an aspect of this disclosure, there is provided a memory management unit that controls, for each predetermined storage unit, a storage destination of data for which a writing request is made by a host, and the memory management unit includes: a storage destination control unit configured to select the storage destination of the data for each storage unit from a main memory having the number of rewritable times less than $10^{15}$ and a cache memory able to execute copy back of writing the data for each storage unit to the main memory in accordance with a predetermined trigger; and a copy back detection unit that detects that the copy back is executed for each storage unit.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a diagram showing an information processing system to which a memory management unit is applied.

DETAILED DESCRIPTION

Figure 2:
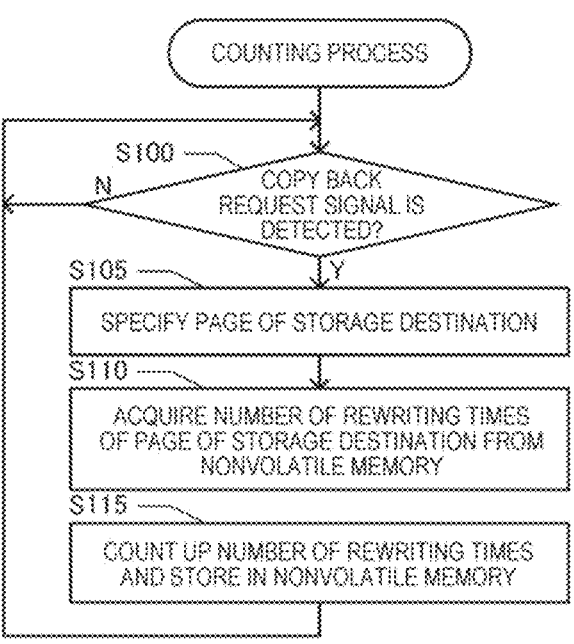
FIG. 2 is a flowchart of a counting process.

Here, an embodiment disclosed here will be described in accordance with the following order.

(1) Configuration of Information Processing System:
(2) Counting Process:
(3) Other Embodiments:

(1) Configuration of Information Processing System

Figure 1:
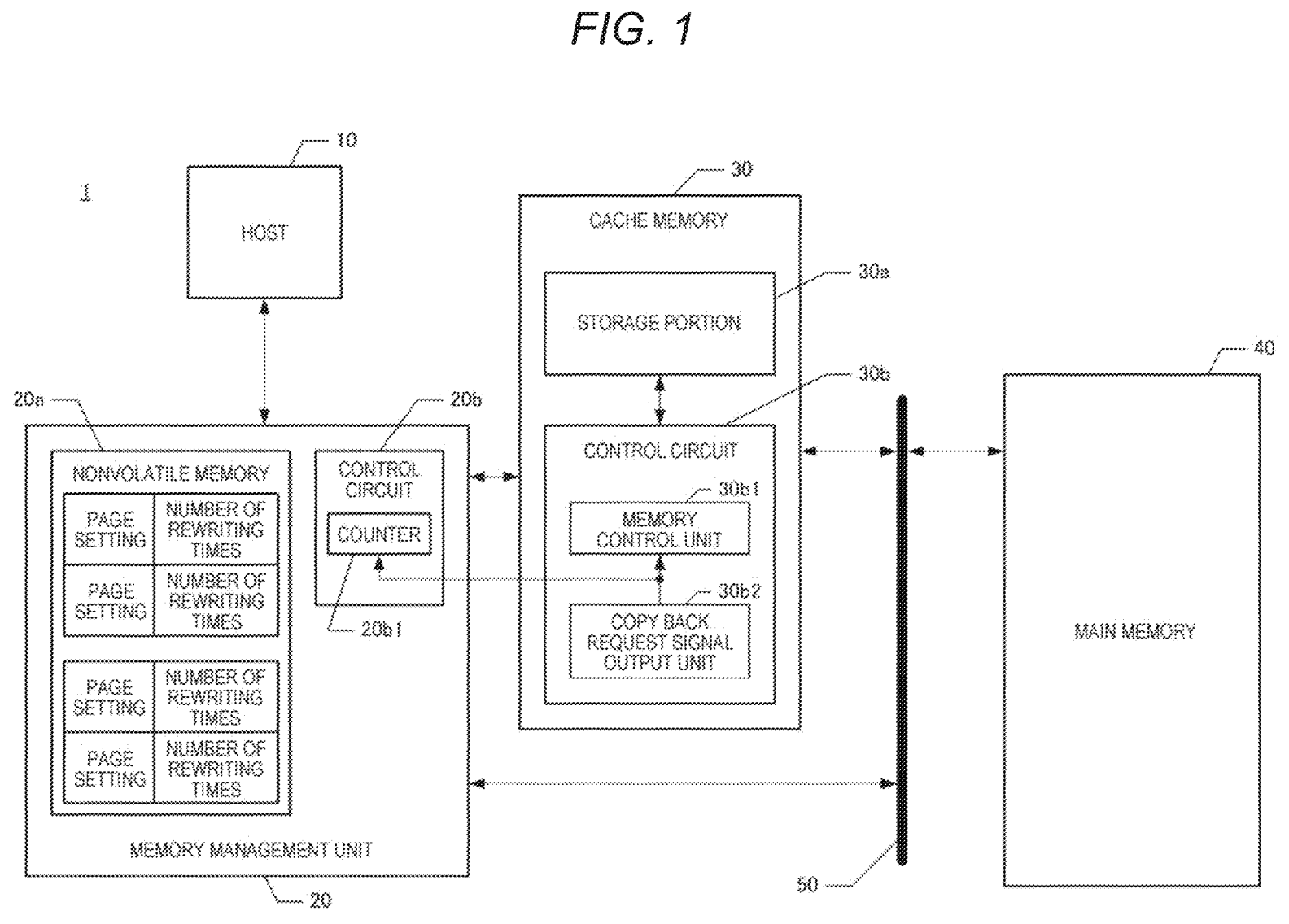

FIG. 1 is a diagram showing an information processing system 1 to which a memory management unit according to an embodiment is applied. The information processing system 1 includes a host 10, a memory management unit 20, a cache memory 30, and a main memory 40. The host 10 is a processor that executes various programs stored in the main memory 40 or the like, and is implemented by, for example, a central processing unit (CPU). In the present embodiment, the main memory 40 is implemented by a magnetoresistive random access memory (MRAM) in which the number of rewritable times is less than $10^{15}$ (including less than $10^{10}$ as an example, for example, $10^6$). The memory management unit 20, the cache memory 30, and the main memory 40 are connected via a bus 50.

The memory management unit 20 is a device that perform management and control on data for each predetermined storage unit. In order to perform the management and control, the memory management unit 20 according to the present embodiment includes a nonvolatile memory 20a and a control circuit 20b. In this specification, the predetermined storage unit is also referred to as a page.

The control circuit 20b is a device for performing the management and control in the above-described memory management unit 20, and can be implemented by various processors. The control circuit 20b has a function (counter 20b1) of counting the number of times copy back is performed in the cache memory 30.

The nonvolatile memory 20a can store a page setting as setting data for each page as the predetermined storage unit. In the nonvolatile memory 20a, the number of rewriting times a storage destination when data of each page is stored in the main memory 40 is rewritten is counted and stored for each page. The nonvolatile memory 20a can be implemented by various memories, for example, MRAMs.

The page setting includes a conversion table between a virtual address and a physical address, a size of a page which is the predetermined storage unit, a setting value indicating whether data is valid or invalid, a setting value indicating whether reading or writing is permitted, and a setting value indicating whether to use the cache memory as the storage destination of the data.

The conversion table is data for converting the virtual address, which is a storage destination of data designated by the host 10, into the physical address of the main memory 40, and details thereof will be described. The size of a page is a value indicating a size of the predetermined storage unit. That is, in the present embodiment, the size of the predetermined storage unit is variable. The setting value indicating whether data is valid or invalid is a value for setting whether the data of the corresponding page is valid or invalid, and when the data is set to be invalid, the data of the corresponding page is not written to the cache memory 30 or the main memory 40. The setting value indicating whether reading or writing is permitted is a value for permitting or prohibiting each of reading and writing for the data of the corresponding page.

The setting value indicating whether to use the cache memory as the storage destination of the data is a value for designating whether the data of each page is a cache target. That is, when it is designated to use the cache memory as a storage destination of data of a certain page, the memory management unit 20 selects the cache memory 30 as the storage destination of the data of the corresponding page. On the other hand, when it is not designated to use the cache memory as the storage destination of the data of the certain page, the memory management unit 20 selects the main memory 40 as the storage destination of the data of the corresponding page. Data for which the cache memory is designated as the storage destination has a higher rewriting frequency than data for which the cache memory is not designated as the storage destination. Therefore, in the present embodiment, it is considered that the storage destination in which the data as the cache target is stored is rewritten more often than the storage destination in which the data not the cache target is stored.

Here, control of a storage destination of data for each predetermined storage unit will be described. In the present embodiment, the host 10 is configured to designate a storage destination of data by a virtual address. The virtual address indicates a predetermined continuous storage unit starting from the virtual address. Accordingly, when the virtual address is designated, data over the predetermined continuous storage unit starting from the virtual address is designated. In the present embodiment, the predetermined storage unit is referred to as the page. In the present embodiment, the above-described page setting is defined in association with each page as the predetermined continuous storage unit determined by the virtual address.

The memory management unit 20 performs address management related to reading and writing of data. When writing of data is focused, the memory management unit 20 controls, for each predetermined storage unit, a storage destination of data for which a writing request is made by the host 10. When the writing request of the data is issued by the host 10, the memory management unit 20 manages an address of a writing destination in accordance with the writing request by the host 10. Specifically, the writing request includes information indicating data as a writing target and the virtual address of the writing destination, and the memory management unit 20 converts the virtual address into a physical address of the main memory 40. Then, the memory management unit 20 associates the data with the physical address as the storage destination.

In the present embodiment, the memory management unit 20 selects and outputs the storage destination of the data from the cache memory 30 and the main memory 40 according to the virtual address of the data. That is, the memory management unit 20 refers to the setting value indicating whether to use the cache memory as the storage destination of the data, and selects the storage destination indicated by the setting value.

When the storage destination is the cache memory 30, the memory management unit 20 outputs, to the cache memory 30, the data in association with the physical address corresponding to the virtual address designated from the host 10. The cache memory 30 includes a storage portion 30a, and stores data in the storage portion 30a together with the instructed physical address as the storage destination from the memory management unit 20.

When the storage destination is the main memory 40, the memory management unit 20 outputs, to the main memory 40, data in association with the physical address corresponding to the virtual address designated from the host 10. The main memory 40 stores data with respect to the instructed physical address as the storage destination from the memory management unit 20.

The cache memory 30 is a memory that stores data as the cache target before the data is stored in the main memory 40. That is, the cache memory 30 includes the storage portion 30a that stores data for each storage unit output from the memory management unit 20. The storage portion 30a can be implemented by, for example, a static random access memory (SRAM).

In the present embodiment, the cache memory 30 has a copy back function. In order to implement the copy back function, the cache memory 30 includes a control circuit 30b that executes the copy back of writing data for each predetermined storage unit to the main memory 40 according to a predetermined trigger. The control circuit 30b includes a memory control unit 30b1 and a copy back request signal output unit 30b2. The memory control unit 30b1 stores the data output by the memory management unit 20 in a predetermined address of the storage portion 30a for each page as the predetermined storage unit. When the copy back function is executed, the physical address of the storage destination is designated from the copy back request signal output unit 30b2 described later. The memory control unit 30b1 extracts data corresponding to the designated physical address from the storage portion 30a, designates the physical address as the storage destination, and transfers the data to the main memory 40. As a result, the main memory 40 stores the data of each page in the corresponding physical address.

The memory control unit 30b1 transfers the data of each page stored in the storage portion 30a to the main memory 40 when the copy back is executed, but does not process a page in which no data is stored, an invalid page, or the like. That is, even if the page is the page as the cache target, the memory control unit 30b1 does not instruct writing for the page in which no data is stored in the storage portion 30a, the invalid page, or the like. In addition, the memory control unit 30b1 does not perform redundant writing. That is, the memory control unit 30b1 does not perform writing again on the data of the page which is already written to the main memory 40 during execution of previous copy back and for which the storage portion 30a is not updated until execution of the current copy back.

The copy back request signal output unit 30b2 is a circuit that determines whether a predetermined trigger occurs, and outputs a signal for requesting the execution of the copy back when the predetermined trigger occurs. In the present embodiment, the predetermined trigger means that "a capacity of data stored in the storage portion 30a is equal to or larger than a threshold". Therefore, the copy back request signal output unit 30b2 measures a capacity of data stored in the storage portion 30a after last copy back is executed, and outputs a copy back request signal when the capacity is equal to or greater than a threshold.

The copy back request signal output unit 30b2 is connected to the memory control unit 30b1 and the control circuit 20b to be described later, and outputs a signal indicating the physical address as the storage destination of the data as a copy back target and the copy back request signal when the predetermined trigger occurs. The signal is supplied to the memory control unit 30b1 and the control circuit 20b. When the copy back request signal is output to the memory control unit 30b1, the memory control unit 30b1 executes copy back to store the data as the copy back target at the designated physical address.

The copy back function is effective in extending a lifespan of the main memory 40 when the number of rewritable times is relatively small and the main memory 40 that can reach, during use, an upper limit of the number of rewritable times is used. That is, when the copy back function is used, the entire data for which the writing request is made is not written to the main memory 40, but the data is temporarily stored in the cache memory 30. If a predetermined trigger does not occur, the data stored in the cache memory 30 may be overwritten with other data without being stored in the main memory 40. Therefore, the lifespan of the main memory 40 is extended as compared with a configuration in which the entire data is written in the main memory 40.

However, when the number of times of rewriting to the main memory 40 cannot be accurately grasped, for example, it is not possible to implement a process for extending a lifespan, such as storing data for which an address in a storage area close to the lifespan is designated as a storage destination, at a different address. In the present embodiment, the memory management unit 20 has a function of counting the number of rewriting times of the main memory 40 for each predetermined storage unit.

The memory management unit 20 implements the function using the nonvolatile memory 20a and the control circuit 20b. Specifically, as described above, the nonvolatile memory 20a is provided with an area in which the number of rewriting times the storage destination when the data of each page is stored in the main memory 40 is rewritten is recorded.

The control circuit 20b manages data of each page based on the page setting stored in the nonvolatile memory 20a. That is, the control circuit 20b sets the storage unit based on the page size indicated by the page setting. The control circuit 20b performs a process of converting a virtual address indicating a storage destination of data designated by the host 10 into a physical address based on the conversion table indicated by the page setting.

Further, the control circuit 20b sets data of invalid set page not to be read or written. Further, the control circuit 20b performs reading or writing on data according to a setting value indicating whether reading or writing is permitted. Further, the control circuit 20b selects the storage destination of the data from the main memory 40 and the cache memory 30 based on the setting value indicating whether to use the cache memory as the data storage destination. That is, the control circuit 20b functions as a storage destination control unit.

The control circuit 20b further includes a counter 20b1. When the copy back request signal output unit 30b2 outputs the copy back request signal and the physical address that is the storage destination of the data as the copy back target, the counter 20b1 counts the number of times data of each page is stored in the main memory 40 based on the signal. The counter 20b1 updates the number of rewriting times stored in the nonvolatile memory 20a based on a count result.

Specifically, the counter 20b1 refers to the nonvolatile memory 20a, and acquires the number of rewriting times of the physical address that is the storage destination of the data as the copy back target. The counter 20b1 updates the nonvolatile memory 20a with a value obtained by adding 1 to the number of rewriting times. That is, when the copy back request signal is detected, the counter 20b1 increments the number of rewriting times of the page as the copy back target. According to the above configuration, the actual number of rewriting times of the main memory 40 can be specified and counted for each page. The counter 20b1 functions as a copy back detection unit in order to detect the execution of the copy back by acquiring the copy back request signal.

The main memory 40 according to the present embodiment is the MRAM, and the number of rewritable times is about $10^6$. Therefore, the number of rewritable times can be reached during use. When such a main memory 40 is used, it is preferable to perform various kinds of control such as adjustment of a use area of the main memory 40 in accordance with whether the number of rewritable times is reached. For example, in the main memory 40, when the number of rewriting times of the storage area corresponding to a specific page exceeds a threshold, it is possible to employ control that prohibits the use of the storage area and stores the data of the specific page in another storage area. According to such control, the lifespan of the main memory 40 can be extended as compared with a case where the control is not performed.

In the present embodiment, the number of rewriting times is stored in the nonvolatile memory 20a. Accordingly, even when power of the information processing system 1 is turned off and then turned on, the number of rewriting times stored in the nonvolatile memory 20a is maintained. Therefore, even when the power is turned off, if the power is turned on thereafter, the number of rewriting times of the main memory 40 can be specified.

Further, in the present embodiment, the page setting is stored in the nonvolatile memory 20a. Accordingly, it is not necessary to perform the operation with an initial setting every time the power is turned on, and the operation can be performed again with a setting that is in place before the power is turned off. In the present embodiment, a correspondence relationship between the virtual address and the physical address is defined by the conversion table, and the size of the page is variable, and thus, when these settings are changed, it may not be consistent with a recording of the number of rewriting times. However, in the present embodiment, since the page setting is stored in the nonvolatile memory 20a, even if the power is turned off, the information processing system 1 can be operated with the same setting when the power is turned on. Therefore, it is possible to continuously perform counting according to the number of rewriting times.

(2) Counting Process

Next, the counting process executed by the control circuit 20b will be described. When the information processing system 1 is activated, the host 10, the memory management unit 20, and the like start processing. In parallel with this processing, the control circuit 20b executes the counting process shown in FIG. 2. When the counting process is started, the counter 20b1 of the control circuit 20b waits until the copy back request signal is detected (step S100).

When the copy back request signal is output from the copy back request signal output unit 30b2 and detected by the counter 20b1 in step S100, the counter 20b1 specifies the page of the storage destination (step S105). That is, since the copy back request signal is output together with the physical address that is the storage destination of the data as the copy back target, the counter 20b1 refers to the conversion table between the virtual address and the physical address, and converts the physical address into the virtual address. As a result, the counter 20b1 can specify the virtual address of the data as the copy back target.

Next, the counter 20b1 acquires the number of rewriting times of the page of the storage destination from the nonvolatile memory 20*a* (step S110). That is, the counter 20*b*1 refers to the nonvolatile memory 20*a*, and acquires the number of rewriting times associated with the page designated by the virtual address specified in step S105.

Next, the counter 20*b*1 counts up the number of rewriting times and stores the number of rewriting times in the nonvolatile memory (step S115). That is, the counter 20*b*1 adds 1 to the number of rewriting times acquired in step S110, and updates the number of rewriting times of each page in the nonvolatile memory 20*a* according to the added value. As a result, the number of times data is written from a start of operation of the main memory 40 to a present time is stored in the nonvolatile memory 20*a* as the number of rewriting times.

(3) Other Embodiments

The above embodiments are examples for carrying out the disclosure, and various other embodiments can be adopted. The memory management unit only needs to be able to control, for each predetermined storage unit, the storage destination of the data for which the writing request is made by the host. That is, the address (virtual address) indicating the storage destination of the data for each predetermined storage unit instructed by the host and the address (physical address) indicating the storage destination of the main memory (or the cache memory) to which the data is written may not match. The memory management unit may convert the virtual address into the physical address. In addition, the memory management unit is constituted by a plurality of circuits formed in the integrated circuit and is not constituted as an integrated chip as an example, but may be constituted as an integrated chip.

The host is a device that issues a writing request of data, and can be implemented by various processors. Of course, the host may perform various requests such as a read request and arithmetic processing in addition to the writing request. The predetermined storage unit is a predetermined data capacity, and data may be written or read for each storage unit.

The cache memory has a function of storing the data of each storage unit output from the memory management unit and executing copy back of writing the data of each storage unit to the main memory according to a predetermined trigger. That is, the cache memory is a memory capable of storing data, and generally operates faster than the main memory. Further, since the cache memory has the copy back function, not all the data for which the writing request is made is necessarily written to the main memory. Therefore, as compared with the configuration in which the entire data is written in the main memory, a period until the main memory reaches the lifespan can be extended.

The cache memory stores data for each storage unit. That is, since the host issues the writing request of the data for each predetermined storage unit, data is written for each predetermined storage unit even in the cache memory. The predetermined trigger may be a condition for executing a process of copying back data from the cache memory to the main memory, and in addition to the above trigger, various other conditions may serve as the trigger. For example, a predetermined time period may be the predetermined trigger, or an external request may be the predetermined trigger. The cache memory may be a volatile memory or a nonvolatile memory.

The memory management unit only needs to be able to detect that the copy back is performed. Therefore, various configurations other than the configuration of counting that the copy back is performed can be adopted. For example, the memory management unit may be used to detect that the copy back is performed and statistically calculate an interval and frequency of the copy back. By using such information, it is possible to perform various kinds of control related to the lifespan of the main memory.

The storage medium that stores the count value of the number of times the execution of the copy back is detected may be any storage medium that counts the number of times the execution of the copy back is detected for each storage unit and stores the count value for each storage unit. That is, when the copy back is executed, since the data of each storage unit stored in the cache memory is written to the main memory, the rewriting is performed for each storage unit. Accordingly, with respect to the storage unit in which the data is stored in the cache memory, the rewriting is performed in a corresponding storage destination in the main memory, and with respect to the storage unit in which the data is not stored, the rewriting is not performed in the main memory. Here, the memory management unit counts the number of times the copy back is performed for each storage unit, and regards the number of times as the number of times the rewriting is performed.

The configuration for counting the number of times the copy back is performed may be various configurations. For example, for each page set for each storage unit, a counter may be provided to count that copy back to an address storing data of each page is performed. In addition, a configuration may be adopted in which one counter is controlled in a time division manner, and the copy back to the address corresponding to each page is counted. Of course, the number of counters may be two or more.

The configuration for detecting the execution of the copy back is not limited to the configuration in which the copy back request signal is output from the cache memory to the memory management unit. For example, in the configuration shown in FIG. 1 described above, the memory management unit 20 may detect a signal indicating completion of access to the bus 50 in communication between the cache memory 30 and the main memory 40, and may consider that copy back is executed.

The storage medium for storing the count value is preferably a nonvolatile memory, but a volatile memory may be used in combination. Specifically, a configuration may be adopted in which the trigger indicating that the copy back is performed and the number of times the copy back is performed are stored in a register, and a value of the nonvolatile memory is counted up according to a value of the register.

In the above-described embodiments, the main memory is an MRAM, but may be another memory. That is, the MRAM has a characteristic that a guaranteed period of data retention is relatively long but a guaranteed number of data rewriting times is relatively small (for example, about $10^6$ times) as compared with other known memories. As described above, even when the characteristic of the MRAM is a characteristic in which the guaranteed number of the rewriting times is relatively small, if it is detected that the copy back is performed or the number of times the copy back is performed is counted, it is possible to perform various kinds of controls such as the control for extending the lifespan.

The main memory is a memory in which the number of rewritable times may be a restriction on use, and the number of rewritable times is less than $10^{15}$. That is, the number of rewritable times of an SRAM or a dynamic random access memory (DRAM) is $10^{15}$ or more, and the number of rewritable times is not practically the restriction on use. On the other hand, the number of rewritable times of the MRAM is about $10^6$ and can reach an upper limit of the number of rewritable times in use. Other examples of such a memory include a resistive random access memory (ReRAM) having the number of rewritable times of about $10^6$.

Further, a method disclosed here can be applied to a program or a method. In addition, the system, the program, and the method as described above may be implemented as a single device, or may be implemented as a plurality of devices, and include various aspects. In addition, it is possible to appropriately change a part thereof to software and a part thereof to hardware. Further, the disclosure may be implemented by a recording medium of a program for controlling a system. Of course, the recording medium of the program may be a magnetic recording medium, a semiconductor memory, or any recording medium to be developed in the future can be considered in the same manner.

According to an aspect of this disclosure, there is provided a memory management unit that controls, for each predetermined storage unit, a storage destination of data for which a writing request is made by a host, and the memory management unit includes: a storage destination control unit configured to select the storage destination of the data for each storage unit from a main memory having the number of rewritable times less than $10^{15}$ and a cache memory able to execute copy back of writing the data for each storage unit to the main memory in accordance with a predetermined trigger; and a copy back detection unit that detects that the copy back is executed for each storage unit.

The number of rewritable times of the main memory is less than $10^{15}$ and can reach the number of rewritable times during use. When such a main memory is used, it is preferable to perform various kinds of control such as adjustment of a use area of the main memory in accordance with whether the number of rewritable times is reached, and delaying a period of reaching the number of rewritable times. In order to perform various kinds of control, it is necessary to specify whether rewriting is performed for each predetermined storage unit corresponding to a rewriting unit of data in the main memory.

In an information processing system using a cache memory having a copy back function, data as a cache target among data for which the writing request is made by a host is written to the cache memory. The copy back function is a function of writing data stored in the cache memory to the main memory in accordance with a predetermined trigger. Therefore, in the system having the copy back function, the entire data as the cache target is not necessarily written to the main memory. That is, when the data stored in the cache memory is rewritten before the predetermined trigger occurs, the data is not stored in the main memory.

In the information processing system in the related art, since it is not possible to detect whether the main memory is rewritten, control related to the lifespan of the main memory cannot be performed. The memory management unit is configured to be capable of detecting whether the main memory is rewritten by detecting that the copy back is performed. According to this configuration, it is possible to specify that rewriting has actually been performed in the memory, and it is possible to perform the control related to the lifespan, such as estimation of the lifespan and control for extending the lifespan.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A memory management unit that controls, for each predetermined storage unit, a storage destination of data for which a writing request is made by a host, the memory management unit comprising:

a storage destination control unit configured to select the storage destination of the data for each storage unit from a main memory having a number of rewritable times less than $10^{15}$ and a cache memory able to execute copy back of writing the data for each storage unit to the main memory in accordance with a predetermined trigger; and a copy back detection unit that detects that the copy back is executed for each storage unit.

2. The memory management unit according to claim 1, further comprising:

a storage medium configured to count a number of times the execution of the copy back is detected for each storage unit and store a count value for each storage unit.

3. The memory management unit according to claim 1, wherein the main memory is an MRAM.

4. The memory management unit according to claim 2, wherein the main memory is an MRAM.

5. The memory management unit according to claim 2, wherein the storage medium is a nonvolatile memory.

* * * * *